United States Patent [19]

McDonald

[11] 4,018,730
[45] Apr. 19, 1977

[54] METHOD FOR EMULSIFYING ASPHALT-RUBBER PAVING MATERIAL AND A STABLE THIXOTROPIC EMULSION OF SAID MATERIAL

[76] Inventor: Charles H. McDonald, 3130 W. Pierce St., Phoenix, Ariz. 85009

[22] Filed: June 6, 1975

[21] Appl. No.: 584,478

[52] U.S. Cl. .................. 260/17.4 R; 106/277; 260/28.5 AS; 260/733; 260/742; 260/745; 260/758; 404/32; 404/44; 404/75

[51] Int. Cl.² ............... C08L 1/00; C08L 95/00; C09D 3/24

[58] Field of Search ............ 106/277, 283; 252/311.5; 260/28, 28.5 AS, 718, 733, 744, 745, 758, 17.4, 732; 404/17, 32, 72, 79

[56] References Cited

UNITED STATES PATENTS

| 2,714,582 | 8/1955 | Day ................. 106/277 X |
|---|---|---|
| 2,941,893 | 6/1960 | McConnaughay ....... 106/277 X |
| 2,978,427 | 4/1961 | Pullar et al. ........ 260/28.5 AS |
| 3,110,604 | 11/1963 | McConnaughay ........ 106/277 |
| 3,338,849 | 8/1967 | Johnson ............ 260/733 X |
| 3,493,408 | 2/1970 | Drukker ............. 106/277 |
| 3,565,842 | 2/1971 | Pitchford .......... 260/28.5 AS |
| 3,607,773 | 9/1971 | Pitchford et al. ...... 252/311.5 |
| 3,738,852 | 6/1973 | Doi et al. ........... 106/277 |
| 3,785,852 | 1/1974 | Schleidt ............. 106/277 |

FOREIGN PATENTS OR APPLICATIONS 342,194  1/1931  United Kingdom .......... 260/745

OTHER PUBLICATIONS

Abraham, Asphalt and Allied Substances, 6th Ed., vol. 3, D. Nostrand Co. Inc. N.J. 1962, pp. 44–45.

*Primary Examiner*—J. Ziegler
*Attorney, Agent, or Firm*—Harris, Kern, Wallen & Tinsley

[57] ABSTRACT

A new method is provided for emulsifing a asphaltrubber pavement repair material into a stable thixotropic emulsion capable of flowing as a liquid upon gentle agitation. The method generally comprises the steps of heating asphalt and rubber to form a jellied reaction product, and admixing a asphalt-rubber soap consisting essentially of water, an anionic water soluble emulsifying agent, a thickner, and the halide of an alkali metal or an alkaline earth metal to form a thixotropic emulsion capable of flowing as a liquid upon gentle agitation.

12 Claims, No Drawings

METHOD FOR EMULSIFYING ASPHALT-RUBBER PAVING MATERIAL AND A STABLE THIXOTROPIC EMULSION OF SAID MATERIAL

BACKGROUND OF THE INVENTION

Asphalt-rubber compositions have been found to be a new and useful pavement material for surfacing and manufacturing roadways, and for repairing cracked roadways and pavements. Such compositions are generally applied by spraying and are difficult to spray because of their high viscosity. Heat may be used to decrease the viscosity but this requires special equipment and experienced personnel in working with the hot material on the job site. Organic solvents may be used to cut such compositions to decrease their viscosity but this adds to the cost of the composition and presents additional problems associated with the handling of organic solvents especially with hot compositions.

Asphalt-rubber compositions have also been applied in the form of a water emulsion which is pourable and sprayable under ambient temperatures. Upon application of such emulsion, the emulsion breaks and the asphalt-rubber composition is deposited on the roadway. Aqueous emulsions of asphalt are known in the art and have been found to be stable and easily pourable and sprayable. A difficulty, however, has been experienced while attempting to emulsify asphalt-rubber compositions containing particulate rubber in that the emulsion tends to "break" or separate upon standing. This is believed to be due to the presence of sulfur in the rubber used in preparing the asphalt-rubber compositions.

In an effort to stablize such emulsions, emulsifiers such as clays and talc have been added to the emulsions to improve their stability. Such emulsifiers do provide for stability but their presence in the emulsion after application to a roadway or pavement presents a risk that the composition will re-emulsify under the action of water and traffic with a consequent washing away of the composition. The presence of such clays and talc also inhibit the initial adhesion of the rubber-asphalt composition to stone aggregate used therewith.

It is therefore an object of the present invention to provide a new method for emulsifying asphalt-rubber paving compositions to provide an emulsion that is stable and will not break or settle-out upon storage. Another object is to provide an emulsified asphalt-rubber paving composition which will not re-emulsify after deposition. Other objects and advantages of the invention will become apparent as the specification proceeds.

SUMMARY OF THE INVENTION

It has been discovered that asphalt-rubber paving compositions may be emulsified with water to provide a stable emulsion that will not break or settle-out upon standing if a specially prepared asphalt-rubber soap is admixed therewith. The emulsion formed thereby is thixtropic in nature, i.e., the emulsion is relatively viscous upon standing, which inhibits the separation of particulate rubber from the emulsion but is converted to a pourable and sprayable liquid upon gentle agitation. The asphalt-rubber soap consists essentially of water, an anionic water soluble emulsifying agent, a thickener, and the halide of an alkali metal or alkaline earth metal, referred to hereinafter as the halide.

DESCRIPTION OF A PREFERRED EMBODIMENT

In a preferred embodiment, rubber and asphalt are heated to produce a jellied reaction product as more fully described in my co-pending application Ser. No. 376,919, filed July 5, 1973, now U.S. Pat. No. 3,891,585 which is incorporated by reference herein and made a part hereof.

The rubber-asphalt reaction product is prepared by heating paving grade asphalt with a penetration range of 10 through 300, to a temperature within the range of from about 350° to about 500° F and adding particulate rubber thereto. The resulting mixture is thoroughly mixed until the composition gels or becomes jellied. No additional heating is required once the rubber is added to the asphalt. The ratio of asphalt to rubber is in the approximate range of about two to about five parts of asphalt for every part of rubber.

All paving grade asphalts from penetration grade 10–10 through 200–300, which includes Pacific Coast User's viscosity gradations AR-1000 to 16,000 are suitable for practicing the instant invention.

Hydrocarbon rubbers are used in the present inventions. By the term "hydrocarbon rubber" is meant non-oil resistant asphalt-soluble rubbers. Non-oil resistant asphalt-soluble rubbers are those rubbers that are partially soluble to the extent from about 2 to about 12% by weight in asphalt and are attached by, react with, or are affected by oils, such as lubricating oils, hydraulic oils and the like. Suitable rubbers that can be employed include unvulcanized, vulcanized or reclaimed rubbers including natural rubber, (NR, polyisoprene polymer), isoprene rubber (IR, polyisoprene polymer), butadiene rubber (BR, polybutadiene polymer), butadiene-styrene rubber (SBR, butadiene-stryrene copolymer) butyl rubber (11R, the isobutylene isoprene polymer) and ethylene propylene rubber (EPM and EPDM, ethylene propylene copolymers and terpolymers which are unvulcanized, vulcanized or reclaimed.

The reclaimed rubber can be devulcanized or partially devulcanized and can be prepared from vulcanized or unvulcanized rubber by the digester process, Heater or Pan process, high pressure steam process, Lancaster-Banbury process, reclamation or other conventional reclaiming processes (Maurice Morton, *Introduction to Rubber Technology*, Van Nostrand Reinhold Co., New York, 1959, pps. 404435). Normally the reclaimed rubber will be prepared from old, worn tires, tire scrap, innertube scrap, retread scrap, tire peel, tire carcass, rubber buffings and other rubber scrap.

In the practice, other types of rubbers, that is, oil resistant and/or non-asphalt soluble rubbers have not been found suitable for preparing the hot elastomeric pavement repair material. For example, rubber which has not been found suitable for the composition are: nitrile (NBR, butadiene acrylonitrile copolymers), epichlorohydrin (ECO, epichlorohydrin polymer and copolymer), neoprene rubber (CR, chloroprene polymers), hypalon (CSM, chloro-sulfonated polyethylene polymers), urethane rubber (AU, EU, urethane polymers or elastomers), polysulfide or thiokol rubber (T, organic polysulfides), silicone rubber (Si, organic silicone polymers), fluoro silicone rubber (FSi, fluorinated organic silicone polymers), fluoro elastomer (FTM, fluorocarbon polymers), acrylic rubbers and polyacrylates (ACM, copolymer of acrylic ester and acrylic halide). These rubbers have been found to be unsuitable for the present invention because they do not react in the desired manner with asphalt under the described conditions to form the required jellied composition.

The following types of rubbers are preferred for use in the invention: (1) ground whole tire rubber (with and without carcass fabric residue); (2) unprocessed rubber buffings, this is rubber buffings that have not been subject to devulcanization or reclaiming processes (a by-product of tire retreading); (3) ground innertubes (natural rubbers and synthetic butyl rubbers); (4) reclaimed rubber (5) partially devulcanized reclaimed rubber; and (6) asphalt soluble rubber. The preferred particle size for the rubber is from about 4 mesh to about +200 mesh USS. Unprocessed rubber refers to rubber that has not been chemically or thermally altered. Unprocessed rubber includes rubbers that have been ground, screened, decontaminated, and treated to remove metals, cord and fabric therefrom.

Based on about 30 to about 70 parts of said asphalt-rubber reaction product, it has been found that a satisfactory emulsion can be achieved when using a soap which is prepared by admixing about 0.5 to about 3.5 parts of a water soluble, anionic emulsifying agent, about 0.3 to about 2 parts of thickener, about 0.2 to about 7 parts of the halide, and about 20 to about 60 parts of water. It must be understood, however, that the invention is not limited to the particular ranges of the aforesaid but contemplates any proportion of such materials which will produce a satisfactory emulsion and which one skilled in the art could develop after having the benefit of the teachings of this disclosure.

The anionic water soluble emulsifying agent comprises a mixture of an alkali hydroxide and an asphalt emulsifier, such as, for example, vinsol resin, tall oil fatty acids, tall oil pitch, oleic acid, stearic acid, animal protein, and casein. The alkali hydroxide is present at a ratio of about 0.01 to about 0.20 parts of said hydroxide for every part of asphalt emulsifier. The alkali hydroxide may be sodium hydroxide potassium hydroxide, ammonium hydroxide, or any other suitable hydroxide capable of forming a soap with the asphalt emulsifier.

Vinsol resin is a hard, high melting dark resin which remains after the resin produced by the distillation of wood is extracted with petroleum solvents. Vinsol resin is soluble in alcohol, has a melting point of about 115° c, and has as its principal constituent, abietic acid, $C_{19}H_{29}COOH$.

The preferred embodiment of the anionic water soluble emulsifying agent also contains a lignin such as for example, an alkali metal salt of lignin or lignin sulfonate. The lignin is believed to function as a stablizing agent and prevents the asphalt-rubber emulsion of the instant invention from breaking too quickly when applied. This allows more time, if necessary, for working with the freshly applied emulsion. The lignin is not an essential ingredient in said emulsifying agent and may be omitted when it is desirable for the emulsion to break upon application. When the lignin is to be used in said emulsifying agent, the lignin may be present at a ratio of one part of lignin to about one-half to about 25 parts of said alkali metal hydroxide-asphalt emulsifier mixture.

The thickener may be of the conventional type such as, for example, boiled corn starch, cellulose derivatives such as carboxymethylcellulose, hydroxyethyl cellulose, and Natrosol 250 which is a non-ionic cellulose derivative produced by Hercules, Inc., polyoxyethylene stearate, and gums.

The alkali metal or alkaline earth metal halide that is preferred is calcium chloride or barium chloride but any other alkali metal or alkaline earth metal halide may also be used. The chlorides of magnesium, potassium, lithium, and sodium may also be used and were found to give good results when used with small percentages of calcium chloride. Exemplary of other such halides which are suitable for use in the instant invention are magnesium bromide, magnesium iodide, magnesium fluoride, calcium fluoride, calcium bromide, calcium iodide, barium fluoride, barium bromide, and barium iodide.

In preparing the emulsion it is preferable to add the jellied asphalt-rubber reaction product to said soap to ensure proper dispersion of the ingredients. It has been found that if the emulsifier, thickener, or halide are added directly to the aspahlt-rubber or the jellied asphalt-rubber reaction product without first being dissolved in water, they may become coated with rubber, asphalt or the jellied reaction product and thereby rendered ineffectual for purposes of forming the desired emulsion. In the case of the thickeners, however, it has been observed that they may be added directly to the emulsion after the emulsion is formed without any apparent loss of their thickening function.

An organic solvent, such as kerosene, for example, may be added to the asphalt-rubber emulsion to improve its spray-ability and spreadability when applied in cold weather.

The emulsion sometimes tends to break if the pH of the soap is below about 8 and for that reason the pH thereof should be maintained above about 8 by the addition of an alkali hydroxide such as potassium hydroxide, sodium hydroxide, or ammonium hydroxide.

The action of the asphalt-rubber soap in maintaining the emulsion in a stable condition is not fully understood but it has been observed that if any one of the constituents of the soap is not used, the emulsion tends to break.

The following represents two preferred emulsion formulations based upon the information supplied by the examples set forth hereinafter.

|  | Formulation No. 1 | | Formulation No. 2 | |
| --- | --- | --- | --- | --- |
|  | Grams | Weight % | Grams | Weight % |
| Asphalt-rubber reaction product (75 wt. % asphalt and 25 wt. % rubber) | 151 | 54.0 | 312.0 | 60.0 |
| Demineralized water | 117 | 42.0 | 195.0 | 37.5 |
| Vinsol resin | 2.5 | 0.9 | 4.0 | 0.8 |
| Sodium hydroxide | 0.22 | 0.1 | 0.375 | 0.1 |
| Calcium chloride | 2.0 | 0.7 | 3.0 | 0.6 |
| Sodium salt or lignin | 0.8 | 0.3 | 1.3 | 0.2 |
| Corn starch (boiled) | 5.0 | 1.8 | 5.0 | 1.0 |

| | Formulation No. 1 | | Formulation No. 2 | |
|---|---|---|---|---|
| | Grams | Weight % | Grams | Weight % |
| | 278.52 | 99.8 | 520.675 | 100.2 |

Formulation Nos. 1 and 2 are relatively dilute due to relatively high percentages of water which was required because of the power limitations of the laboratory scale mixing apparatus used in preforming the experimental work reported herein. More concentrated forms of formulation Nos. 1 and 2 may be made by using less water and when larger scale commercial stirrers are available. It should be noted that dilute emulsions are much more difficult to stablize and thus by achieving successful dilute emulsions, the more concentrated forms of such emulsions would also be stable, if not more so.

In some of the examples reported hereinafter a slight degree of separation of solids from the emulsion was noted. Where this has occured, such emulsions are still considered to be successful emulsions within the contemplation of the instant invention because the separated solids are readily re-dispersed upon agitation. In practical operations, the emulsion will be agitated when it is pumped from storage and made ready for use, and thus any such solids will be re-dispersed within the emulsion. Furthermore, such separations were noted in relatively dilute laboratory emulsions. Inasmuch as emulsions prepared for commercial use may be more concentrated when more powerful mixers are available, the resultant emulsion will probably be more stable than corresponding dilute laboratory emulsions, and such separation as observed in certain dilute emulsions will most likely not even appear in more concentrated emulsions.

EXAMPLE 1

129 grams of an aqueous asphalt-rubber soap solution was prepared by admixing 2 grams of $CaCl_2$, 2½ grams of corn starch, and 122 grams of an aqueous solution consisting of 400 parts of water, 9 parts of Vinsol resin, 1 part of NaOH, and 4 parts of the sodium salt of lignin. The soap mixture was stirred and heated to 110° F to form a solution.

113 grams of Los Angeles basin asphalt having a Pacific Coast User's viscosity grade of AR-1000 was heated to 420° F, and 37.7 grams of cryogenic tire peel crushed to a size that will pass a 100 Tyler screen referred to as CTP-100, was admixed therein for at least ten minutes while stirring. The temperature of the mixture was maintained at a temperature of at least 350° F until the rubber and asphalt reacted to form a jellied composition.

The hot jellied composition was slowly poured into the aqueous soap solution prepared as aforesaid and stirred to form an emulsion. The viscosity of the emulsion in centipoises was measured at intervals after the emulsion was formed are reported in Table 1 hereinbelow.

TABLE 1

| Emulsion Temperature in ° F | Viscosity in Centipoises | Time After Emulsification | |
|---|---|---|---|
| 118 | 5,000 | 0 Hours | 15 Minutes |
| 86 | 7,000 | 0 Hours | 40 Minutes |

TABLE 1-continued

| Emulsion Temperature in ° F | Viscosity in Centipoises | Time After Emulsification | |
|---|---|---|---|
| 75 | 5,000 | 18 Hours | 0 Minutes |
| 75 | 5,000 | 43 Hours | 0 Minutes |
| 75 | 5,000 | 66 Hours | 0 Minutes |
| 75 | 5,000 | 91 Hours | 0 Minutes |
| 80 | *100,000 | 168 Hours | 0 Minutes |
| 80 | 50,000 | 168 Hours | 0 Minutes |
| 75 | *50,000 | 215 Hours | 0 Minutes |
| 75 | 42,000 | 215 hours | 0 Minutes |
| 75 | *42,000 | 360 Hours | 0 Minutes |
| 75 | 22,000 | 360 Hours | 0 Minutes |

The viscosities of the samples marked with an asterisk (*) in this and all other examples were measured when the emulsion was observed to be in a thixotropic condition and before stirring. All the other viscosity measurements were made immediately after stirring when the emulsion was observed to be in a liquid, pourable condition. A comparision of the viscosities measured at 168 hours and at 215 hours before and after stirring demonstrates the thixotropic nature of the emulsion which was observed to remain stable and showed no signs of breaking throughout the entire 360 hour period during which the viscosity measurements were made.

EXAMPLE 2

Example 1 was repeated except for the use of 1 gram of corn starch in place of the 2 1/2 grams of corn starch used in Example 1. Viscosity measurements taken at intervals after the emulsion was formed are reported in Table 2 hereinbelow.

TABLE 2

| Emulsion Temperature in ° F | Viscosity in Centipoises | Time After Emulsification | |
|---|---|---|---|
| 140 | 2,500 | 0 Hours | 10 Minutes |
| 80 | 1,500 | 3 Hours | 0 Minutes |
| 75 | 3,000 | 21 Hours | 0 Minutes |
| 75 | 3,000 | 46 Hours | 0 Minutes |
| 80 | 3,000 | 123 Hours | 0 Minutes |
| 75 | * 5,000 | 168 Hours | 0 Minutes |
| 75 | 3,000 | 168 Hours | 0 Minutes |
| 75 | *15,000 | 312 Hours | 0 Minutes |
| 75 | 4,000 | 312 Hours | 0 Minutes |

The rise in viscosity in the last two readings in Table 2 is believed due to excessive loss of water. The emulsion was observed to be stable and no breaking was observed during the 312 hour period during which viscosity measurements were made.

EXAMPLE 3

208 grams of an aqueous rubber-asphalt soap solution was prepared by admixing 3 grams of $CaCl_2$, 5 grams of corn starch, and 200 grams of an aqueous solution consisting of 400 parts of water, 9 parts of Vinsol resin, 1 part of NaOH, and 4 parts of lignin. The soap mixture was stirred and brought to a boil for one minute to form a solution.

113 grams of Los Angeles Basin AR-1000 viscosity grade asphalt was heated to 410° F and admixed with 38 grams of CTP-100 grade rubber and mixed for ten minutes until a jellied reaction product was formed. The jellied reaction product was added to the soap solution prepared as aforesaid and stirred to form a emulsion.

The viscosity of the emulsion in centipoises was measured at intervals after the emulsion was prepared and are reported in Table 3 hereinbelow.

TABLE 3

| Emulsion Temperature in ° F | Viscosity in Centipoises | Time After Emulsification | |
|---|---|---|---|
| 150 | 2,500 | 0 Hours | 10 Minutes |
| 133 | | | |
| 85 | | | |
| 75 | 4,000 | 18 Hours | 0 Minutes |
| 75 | 4,000 | 43 Hours | 0 Minutes |
| 80 | * 5,000 | 120 Hours | 0 Minutes |
| 80 | 3,000 | 120 Hours | 0 Minutes |
| 75 | * 4,800 | 168 Hours | 0 Minutes |
| 75 | 3,200 | 168 Hours | 0 Minutes |
| 75 | * 7,000 | 310 Hours | 0 Minutes |
| 75 | 3,500 | 310 Hours | 0 Minutes |

The emulsion was observed to remain stable throughout the entire 310 hour period during which the viscosity measurements were made except for the floatation of some rubber at the surface which was readily reincorporated by stirring on the second day after the emulsion was formed.

EXAMPLE 4

Example 3 was repeated except that corn starch was omitted and the soap was not boiled but was heated to 110° F only. An emulsion was formed but on the day after its formation, a substantial volume of rubber particles were observed to settle to the bottom of the mixing vessel.

The viscosity of the emulsion and in centipoises was measured at intervals after the emulsion was formed and are reported in Table 4 hereinbelow.

TABLE 4

| Emulsion Temperature in ° F | Viscosity in Centipoises | Time After Emulsification | |
|---|---|---|---|
| 133 | 500 | 0 Hours | 20 Minutes |
| 75 | 700 | 4 Hours | 0 Minutes |
| 75 | 400 | 23 Hours | 0 Minutes |
| 80 | * 900 | 100 Hours | 0 Minutes |
| 80 | 300 | 100 Hours | 0 Minutes |
| 75 | *1,000 | 144 Hours | 0 Minutes |
| 75 | 400 | 144 Hours | 0 Minutes |
| 75 | *1,200 | 288 Hours | 0 Minutes |
| 75 | 500 | 288 Hours | 0 Minutes |

It will be noted that the viscosities of Example 4 which do not contain any starch, were much less than the corresponding viscosities of Example 3 which contain corn starch.

EXAMPLE 5

Example 4 was repeated except that 5 grams of corn starch was added to the soap and brought to a boil for one minute while stirring constantly. The resultant emulsion was a thixotropic jell which did not settle-out upon standing.

EXAMPLE 6

Example 3 was repeated except for the substitution of tire peel ground to pass through a No. 16 Tyler screen and retained by a No. 25 Tyler screen.

The viscosity of the resultant emulsion was measured to centipoises at intervals after the emulsification and the results reported in Table 6 hereinbelow.

TABLE 6

| Emulsion Temperature in ° F | Viscosity in Centipoises | Time After Emulsification | |
|---|---|---|---|
| 150 | | | |
| 154 | 1,200 | 0 Hours | 10 Minutes |
| 119 | 1,900 | | |
| 110 | | 0 Hours | 30 Minutes |
| 75 | 3,000 | 19 Hours | 0 Minutes |
| 80 | *3,000 | 96 Hours | 0 Minutes |
| 80 | 2,200 | 96 Hours | 0 Minutes |
| 75 | *3,000 | 144 Hours | 0 Minutes |
| 75 | 2,200 | 144 Hours | 0 Minutes |
| 75 | *3,700 | 288 Hours | 0 Minutes |
| 75 | 2,500 | 288 Hours | 0 Minutes |

The emulsion was observed to remain stable throughout the entire 288 hour period during which the viscosity measurements were made.

EXAMPLE 7

Example 4 was repeated except for the omission of corn starch and the substitution of tire peel which was ground to pass through a No. 16 Tyler screen and retained by a No. 25 Tyler screen. A heavy settlement of rubber was noted on the 5th day after the emulsion was formed. A rubber float and some settlement was noted on the 11th day after emulsion was formed.

The viscosity of the emulsion in centipoises was measured at intervals after the emulsion was formed and was reported in Table 7 hereinbelow.

TABLE 7

| Emulsion Temperature in ° F | Viscosity in Centipoises | Time After Emulsification | |
|---|---|---|---|
| 150 | 400 | 0 Hours | 10 Minutes |
| 110 | 700 | 0 Hours | 30 Minutes |
| 80 | *2,300 | 77 Hours | 0 Minutes |
| 80 | 400 | 77 Hours | 0 Minutes |
| 75 | *1,000 | 120 Hours | 0 Minutes |
| 75 | 400 | 120 Hours | 0 Minutes |
| 75 | *1,000 | 264 Hours | 0 Minutes |
| 75 | 400 | 264 Hours | 0 Minutes |

EXAMPLE 8

Example 3 was repeated except for replacing the rubber used in Example 3 with tire peel ground to pass through a No. 10 Tyler screen and retained by a No. 16 Tyler screen. The viscosity of the resultant emulsion was measured at intervals after the emulsion was formed and the measurements in centipoises are reported in Table 8 hereinbelow.

TABLE 8

| Emulsion Temperature in ° F | Viscosity in Centipoises | Time After Emulsification | |
|---|---|---|---|
| 130 | 2,000 | 0 Hours | 20 Minutes |
| 85 | *4,500 | 2 Hours | 0 Minutes |
| 85 | 3,000 | 2 Hours | 0 Minutes |
| 80 | *4,500 | 23 Hours | 0 Minutes |
| 80 | 2,500 | 23 Hours | 0 Minutes |
| 75 | *2,700 | 48 Hours | 0 Minutes |

TABLE 8-continued

| Emulsion Temperature in ° F | Viscosity in Centipoises | Time After Emulsification | |
|---|---|---|---|
| 75 | 2,000 | 192 Hours | 0 Minutes |
| 75 | *3,200 | 192 Hours | 0 Minutes |
| 75 | 2,200 | | |

The emulsion was observed to remain stable throughout the entire 192 hour period during which the viscosity measurements were made.

EXAMPLE 9

Example 8 was repeated except for the use of 114 grams of asphalt, 57 grams of rubber, and 2 1/2 grams of corn starch in place of the amounts thereof used in Example 8. The viscosities of the resultant emulsion in centipoises was measured at intervals after emulsion was formed and are reported in Table 9 hereinbelow.

TABLE 9

| Emulsion Temperature in ° F | Viscosity in Centipoises | Time After Emulsification | |
|---|---|---|---|
| 130 | 1,500 | 0 Hours | 20 Minutes |
| 85 | 1,500 | 0 Hours | 40 Minutes |
| 75 | *3,500 | 24 Hours | 0 Minutes |
| 75 | 1,400 | 24 Hours | 0 Minutes |
| 75 | *4,000 | 167 Hours | 0 Minutes |
| 75 | 1,200 | 167 Hours | 0 Minutes |

The emulsion was observed to remain stable throughout the 167 hour period during which the viscosity measurements were recorded but on the 7th day after the emulsion was made, some rubber was observed to float on top of the emulsion but such rubber was readily re-incorporated into the emulsion upon stirring.

EXAMPLE 10

Example 8 was repeated except for the use of 114 grams of asphalt and 28.5 grams of rubber in place of the amounts thereof used in Example 8. The grade of asphalt used was also changed to AR-16,000. The resultant emulsion was satisfactory and did not settle-out.

EXAMPLE 11

Example 3 was repeated except for the use of 114 grams of asphalt and 22.8 grams of rubber in place of the amounts thereof used in Example 3. The rubber used had a more wooley texture than the rubber used in Example 3 and contained 1.4 grams of calcium carbonate. The resultant emulsion produced a thixotropic jell which did not separate by the 7th day after the emulsion was formed. The viscosities of the emulsion in centipoises was measured at intervals after the emulsion was formed and are reported in Table 11 hereinbelow.

TABLE 11

| Emulsion Temperature in ° F | Viscosity in Centipoises | Time After Emulsification | |
|---|---|---|---|
| 165 | 1,000 | 0 Hours | 5 Minutes |
| 75 | *4,000 | 24 Hours | 0 Minutes |
| 75 | 3,200 | 24 Hours | 0 Minutes |
| 75 | *4,700 | 167 Hours | 0 Minutes |
| 75 | 2,900 | 167 Hours | 0 Minutes |

EXAMPLE 12

An emulsion was made pursuant to the procedure set forth in Example 1 using the following ingredients:
114 grams of asphalt
38 grams of TP .044 rubber which was ground to pass a No. 16 Tyler screen and retained on a No. 25 Tyler screen
195 grams of demineralized water
4 grams of Vinsol resin
0.375 grams of sodium hydroxide
1.3 grams of Indulin C, a lignin emulsifier
3 grams of calcium chloride
5 grams of corn starch The rubber-asphalt jellied composition was allowed to cool to about 306° F before being admixed with the soap. The viscosities of the resultant emulsion in centipoises was measured at intervals after the emulsion was formed and the results reported in Table 12 hereinbelow.

TABLE 12

| Day Emulsion Prepared | Emulsion Temperature in ° F | Viscosity Centipoises | Comments |
|---|---|---|---|
| 1st day | 150 | 800 | Smooth, no settling |
| 6th day | 77 | *4,500 | Smooth, thixotropic jell |
| 6th day | 77 | 2,200 | Smooth, appears to be homogeneous |
| 13th day | 77 | *2,000 | Smooth, appears to be homogeneous |
| 13th day | 77 | 1,400 | Smooth, appears to be homogeneous |

The emulsion was observed to remain stable throughout the 13 day period during which the viscosity measurements were made.

EXAMPLE 13

Example 12 was repeated except for the use of 0.6 grams of NaOH in place of the amount of NaOH used in Example 12, and the substitution of Orzan A in place of Indulin C. Orzan A is a 30 percent solution of solids of ammonium lignin sulfonate, having a pH of 3.5, and is a product of the Crown Zellerback Corporation of North Portland, Oregon.

The viscosities of the resultant emulsion are reported in Table 13 hereinbelow.

TABLE 13

| Preparation of Emulsion | Emulsion Temperature in ° F | Viscosity Centipoises | Comments |
|---|---|---|---|
| 1st day | 153 | 700 | A few clumps of rubber |
| 1st day | 77 | *1,500 | |
| 1st day | 77 | 500 | Appears to be homogeneous |
| 2nd day | 61 | *2,000 | Appears to be homogeneous |
| 2nd day | 61 | 700 | Appears to be homogeneous |
| 6th day | 77 | *1,400 | Appears to be homogeneous |
| 6th day | 77 | 1,000 | Appears to be homogeneous |

The emulsion was observed to remain stable throughout the six day period during which the viscosity measurements were made.

EXAMPLE 14

Example 12 was repeated except that Polyfon H was substituted for Indulin C. Polyfon H is a sulfonated lignin made by Westvaco Chemical Company of North Charleston, South Carolina. Th viscosity of the emulsion was measured at intervals after the emulsion was formed and is reported in Table 14 hereinbelow.

Table 14

| Preparation of Emulsion | Emulsion Temperature in ° F | Viscosity Centipoises | Comments |
|---|---|---|---|
| 1st day | 144 | 600 | Well dispersed, black and and fluid. A side sample showed tendency to aggregate after cooling. |
| 2nd day | 77 | *1,800 | Appeared to be homogeneous |
| 2nd day | 77 | 700 | Appeared to be homogeneous |

The emulsion was observed to remain stable throughout the two day period during which the viscosity measurements were made.

EXAMPLE 15

Example 12 was repeated except that hydroxyethyl cellulose was substituted for corn starch and the soap was not boiled. The viscosity measurements of the resultant emulsion are set forth in Table 15 hereinbelow.

TABLE 15

| Preparation of Emulsion | Emulsion Temperature in ° F | Viscosity Centipoises | Comments |
|---|---|---|---|
| 1st day | 144 | 2,300 | well dispersed, semi-gelatinous |
| 1st day | 70 | *8,000 | |
| 1st day | 70 | 4,000 | some lumpiness |
| 2nd day | 70 | *4,600 | |
| 2nd day | 70 | 3,800 | some easily dispersed settlement |

The emulsion was observed to remain stable throughout the period during which the viscosity measurements were made except for some settlement which was quickly dispersed upon agitation.

While the embodiment of the invention shows in herein for purposes of the disclosure are at present considered to be preferred, it is to be understood that this invention is intended to cover all changes and modifications in said embodiment which fall within the spirit and scope of the invention.

EXAMPLE 16

108 grams of an aqueous asphalt-rubber soap solution was prepared by admixing 3 grams of $CaCl_2$, 5 grams of corn starch, and 200 grams of an aqueous solution consisting of 400 parts of water, 9 parts of Vinsol resin, 1 part of NaOH, and 4 parts of the sodium salt of lignin. The soap mixture was stirred and boiled for one minute.

114 grams of AR-1000 Los Angeles basin asphalt was heated to 410° F, and 38 grams of tire peel crushed to a size that will pass a number 16 Tyler screen and be retained on a number 25 Tyler screen, was admixed therein for at least 10 minutes while stirring to form a jellied composition. 15 grams of kerosene was admixed with said jellied composition which caused a decrease in temperature of said composition to about 330° F.

The hot jellied composition with kerosene was slowly poured into said aqueous soap solution prepared as aforesaid and stirred to form an emulsion. The viscosity of the emulsion in centipoises was measured at intervals after the emulsion was formed and are reported in Table 16 hereinbelow.

TABLE 16

| Emulsion Temperature in ° F | Viscosity in Centipoises | Time After Emulsification | |
|---|---|---|---|
| 148 | 700 | 0 Hours | 10 Minutes |
| 90 | *3,200 | 1 Hour | 20 Minutes |
| 90 | 1,500 | 1 Hour | 20 Minutes |
| 77 | *2,000 | 2 Hours | 30 Minutes |
| 77 | 1,000 | 2 Hours | 30 Minutes |
| 60 | *900 | 190 Hours | |
| 60 | 400 | 190 Hours | |
| 60 | *600 | 264 Hours | |
| 60 | 300 | 264 Hours | |

What I claim as my invention is:

1. A method for emulsifying a asphalt-rubber pavement material into a stable, thixotropic emulsion capable of flowing as a liquid upon agitation comprising the steps of:
   a. heating a mixture of about 2 to about 5 parts of paving grade asphalt with a penetration range of 10 through 300 and about 1 part of particulate non-oil resistant asphalt soluble rubber selected from the group consisting of whole tire rubber, reclaimed rubber and partially devulcanized reclaimed rubber to a temperature within the range of about 350° F to about 500° F forming a jellied reaction product,
   b. admixing said jellied reaction product with a asphalt-rubber soap consisting essentially of water, an anionic water soluble emulsifying agent, a thickener, and a halide of an alkali metal or an alkaline earth metal.

2. The method as set forth in claim 1 wherein said anionic water soluble emulsifying agent comprises a soap of an asphalt emulsifier, and wherein said halide is selected from the group consisting of the halides of calcium, barium, magnesium, sodium, potassium, lithium, or mixtures thereof.

3. The method as set forth in claim 2 wherein said halide is chlorine.

4. The method as set forth in claim 2 wherein said thickener is boiled starch.

5. The method set forth in claim 2 wherein said anionic water soluble emulsifying agent comprises a soap of an asphalt emulsifier and a lignin selected from the group consisting of lignin salt and lignin sulfonate.

6. The method as set forth in claim 2 wherein said anionic water soluble emulsifying agent comprises a soap of a lignin salt and a hard, high melting dark resin which remains after the resin produced by the distillation of wood is extracted with petroleum solvents, said resin characterized by being soluble in alcohol, having a melting point of about 115° C and having abietic acid as the principal constituent thereof, said thickener is boiled starch, and said halide is calcium chloride, barium chloride, or a mixture thereof.

7. An emulsified, thixotropic pavement material comprising the reaction product between paving grade asphalt and rubber selected from the group consisting of whole tire rubber, reclaimed rubber and partially devulcanized reclaimed rubber, said asphalt and said rubber heated to a temperature within the range of about 350° F to about 500° F and a asphalt-rubber soap consisting essentially of water, an anionic water soluble emulsifying agent, a thickener, and a halide of an alkali metal or an alkaline earth metal.

8. The emulsified material set forth in claim 7 wherein said anionic water soluble emulsifying agent comprises a soap of an asphalt emulsifier, and wherein said halide is selected from the group consisting of the halides of calcium, barium, magnesium, sodium, potassium, lithium, or mixtures thereof.

9. The emulsified material set forth in claim 7 wherein said halide is chlorine.

10. The emulsified material set forth in claim 7 wherein said thickener is boiled starch.

11. The emulsified material set forth in claim 7 wherein said anionic water soluble emulsifying agent comprises a soap of an asphalt emulsifier and a lignin selected from the group consisting of lignin salt and lignin sulfonate.

12. The emulsified material set forth in claim 7 wherein said anionic water soluble emulsifying agent comprises a soap of a lignin salt and a hard, high melting dark resin which remains after the resin produced by the distillation of wood is extracted with petroleum solvents, said resin characterized by being soluble in alcohol, having a melting point of about 115° C and having abietic acid as the principal constituent thereof, said thickener is boiled starch, and said halide is calcium chloride, barium chloride, or a mixture thereof.

* * * * *